(No Model.)
F. SPALDING.
MICROMETER GAGE.
No. 557,445.
Patented Mar. 31, 1896.
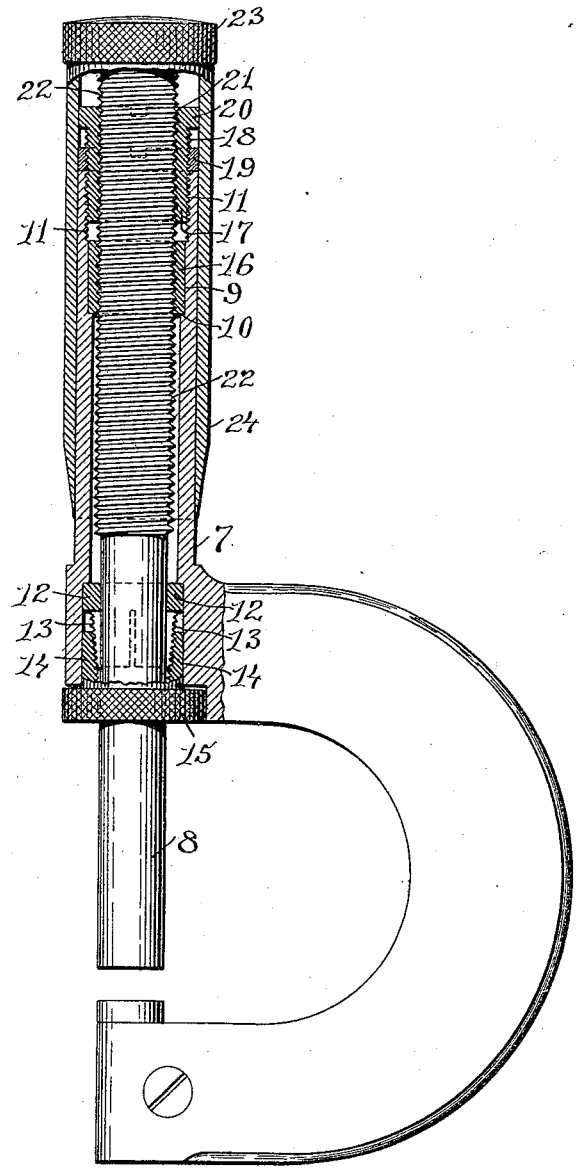
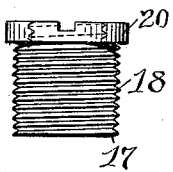
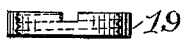
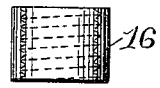
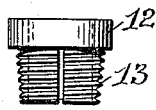
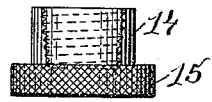
WITNESSES:
M. F. Bligh.
Chas. H. Luther Jr.
INVENTOR:
Frank Spalding,
by Joseph A. Miller & Co.,
Attys.

UNITED STATES PATENT OFFICE.

FRANK SPALDING, OF PROVIDENCE, RHODE ISLAND, ASSIGNOR TO THE BROWN & SHARPE MANUFACTURING COMPANY, OF SAME PLACE.

MICROMETER-GAGE.

SPECIFICATION forming part of Letters Patent No. 557,445, dated March 31, 1896.

Application filed May 28, 1895. Serial No. 550,952. (No model.)

*To all whom it may concern:*

Be it known that I, FRANK SPALDING, of the city of Providence, in the county of Providence and State of Rhode Island, have invented certain new and useful Improvements in Micrometer-Gages, of which the following is a full, clear, and exact description, reference being had to the accompanying drawings, forming part of this specification.

In micrometer-gages it is essential that the spindle shall maintain its true axial position, so that the plane of the end of the spindle shall at all times be exactly parallel with the plane of the anvil, and it is also essential that the screw on the spindle shall turn in the threads of the nut of the barrel with little friction and without backlash or slip.

One object of this invention is to provide a convenient device for clamping the spindle in the barrel securely without disturbing in the least the exact axial relation of the spindle to the barrel or the plane of the end of the spindle with the plane of the anvil.

Another object of the invention is to provide a means of ready adjustment of the bearings for the screw-threaded spindle of a micrometer-gage.

The invention consists in the peculiar and novel construction, more fully set forth hereinafter, of a device for clamping the spindle and adjusting the screw-bearings with reference to the screw on the micrometer-spindle.

Figure 1 is a sectional view of a micrometer barrel and spindle provided with my improvements shown in connection with the usual form of a micrometer-gage. Fig. 2 is a side view of the threaded sleeve or follower. Fig. 3 is a side view of the lock-nut; Fig. 4, a side view of an internally-threaded cylinder forming the fixed nut-bearing of the screw on the spindle. Fig. 5 is a side view of the split clamp-cylinder, and Fig. 6 is a side view of the clamping-cylinder.

Similar numbers of reference indicate corresponding parts in all the figures.

In the drawings, 7 indicates the barrel, which carries devices for causing the advancement or retraction of the spindle 8 as well as the means for clamping the spindle in place. This barrel is supported by any suitable means in a position opposite to an "anvil," so called, between which and the end of the spindle an article may be gaged. At its lower end this barrel has an enlarged recess to receive the spindle-clamping device, while at its upper portion is the enlargement 9, the lower end of which forms a step 10, and an internally-screw-threaded portion 11 having a larger internal diameter than that of the enlargement 9.

In the recess at the lower end of the barrel 7 is seated and frictionally secured the ring 12 having the segmental arms 13 13, the outer diameter of which is less than that of the ring 12 and tapers toward the lower end, this outer surface being screw-threaded. Working on this screw-thread is the internally-screw-threaded sleeve 14 of the nut 15, the sleeve being contained between the arms 13 and the inner surface of the barrel 7.

Located in the enlargement 9 against the step 10 is the internally-screw-threaded sleeve 16, which is usually driven in place, but may be otherwise secured. Above this sleeve 16 the take-up-screw sleeve 17 is mounted partially by engagement of its outer screw-thread 18 with the internal screw-thread 11 of the recess or enlargement at the upper end of the barrel 7 and partially by the engagement of this thread 18 with the internal thread of the ring 19, which rests against the end of the barrel 7 and serves as a lock-nut. The upper end of the take-up screw is formed by an annular flange 20, having an extreme diameter equal to that of the barrel 7, and the inner surface of this sleeve is furnished with a screw-thread 21 corresponding to that of the sleeve 9.

The spindle 8 is furnished with the screw-thread 22 of a size and pitch corresponding with the internal screw-threads of the sleeves 9 and 17. At the lower portion the spindle closely fits but freely passes through the ring 12 and between its arms 13, while at the upper end the spindle is rigidly secured to the thumb-nut 23, forming part of the casing 24, which embraces and closely fits the barrel 7.

The screw-thread 21 of the take-up device is of different size or pitch to that marked 18 on its outer surface, the screw-thread 18, the threads in the ring 19, and the thread 11 being, preferably, finer than the threads 21 and 22, as a nicer adjustment is required in the take-up screw.

It will be apparent that the operation of moving the spindle toward or away from the anvil is caused by the rotation of the nut 23 and that the engagement of the screw-thread 22 of the spindle 8 with the threads of the ring 19, the internal thread 11 of the post, and the thread of the sleeve 9 will cause the advancement or retraction of the spindle under said rotation. It will also be evident that the spindle may be readily clamped, when set, by the screwing of the clamping-nut 15 onto the segmental arms 13 to contract these arms in equal proportions and to thus grip the spindle 8 without affecting the axial alinement of the spindle with relation to the barrel and consequently the plane of its lower end surface.

Should the screw-threads which cause the advancement or retraction of the spindle become worn, the take-up screw may be adjusted to take up such wear, so that in effect one side of the screw-thread 22 on the spindle will be held against one side of the thread in the sleeve 9, while the opposite side of the thread 22 will bear against the corresponding side of the thread 21 of the sleeve 17, this sleeve, when adjusted, being locked in position by the locking-ring 19.

Having thus described my invention, I claim as new and desire to secure by Letters Patent—

1. In a micrometer-gage, the combination with a supporting-barrel, and two screw-threaded sleeves carried thereby one of which is adjustable with reference to the other, of a spindle having a screw-thread engaged in the threads of said sleeves.

2. In a micrometer-gage, the combination with the supporting-barrel and the screw-threaded spindle supported in the barrel of an internally-screw-threaded sleeve supported in the barrel and in engagement with the screw-threads of the spindle and an internally-screw-threaded sleeve also in engagement with the screw-threads of the spindle and connected with the supporting-barrel by a screw-thread engagement the pitch of which differs from the pitch of the screw-thread on the spindle, whereby the frictional contact of the screw-threads of the sleeves with the screw-thread on the spindle can be regulated, as described.

3. In a micrometer-gage, the combination with the spindle 8, provided with the screw-thread 22, the barrel 7, the clamping device supported at one end of the barrel, and the internally-screw-threaded sleeve 16, secured in the barrel, of the sleeve 17, internally threaded to engage with the screw-threads on the spindle 8, and externally screw-threaded with a screw-thread of finer pitch than the screw-threads on the spindle, the screw-threads 11 on the end of the supporting-barrel, the screw-threaded lock-ring 19 and the annular flange 20, whereby the friction on the spindle is regulated, the bearing of the leading screw on the spindle adjusted, and the adjustment secured, as described.

4. In a micrometer-gage, the combination with the barrel 7, the sleeve 16, the take-up sleeve 17, the locking-ring 19, the spindle 8 secured to the casing 24 and provided with the screw-thread 22 engaged in the screw-threads of the sleeves 9 and 17, of the ring 12 having the segmental arms 13 13 with a tapering screw-threaded outer surface, and the clamping-nut 15 having the threaded sleeve 14 embracing the segmental arms and adapted to compress the same against the spindle.

5. In a micrometer-gage, the combination with the barrel 7 having the screw-thread 11, the internally-threaded sleeve 16 mounted in the barrel, the take-up sleeve 17 having the threads 18 and 21, the thread 18 being engaged in the thread 11 of the barrel, and the locking-ring 19 mounted on the sleeve 17, of the spindle 8 having the screw-thread 22 engaged in the screw-threads of the sleeves 9 and 17, and means for rotating the spindle.

In witness whereof I have hereunto set my hand.

FRANK SPALDING.

Witnesses:
JOSEPH A. MILLER, Jr.,
M. F. BLIGH.